US008331878B2

United States Patent
Baker et al.

(10) Patent No.: US 8,331,878 B2
(45) Date of Patent: Dec. 11, 2012

(54) EFFICIENT CQI SIGNALING MIMO SYSTEMS WITH VARIABLE NUMBERS OF BEAMS

(75) Inventors: Matthew Peter John Baker, Canterbury (GB); Timothy James Moulsley, Caterham (GB)

(73) Assignees: Koninklijke Philips Electronics N.V., Eindhoven (NL); Sharp Corporation, Osaka (JP)

(*) Notice: Subject to any disclaimer, the term of this patent is extended or adjusted under 35 U.S.C. 154(b) by 886 days.

(21) Appl. No.: 12/443,731

(22) PCT Filed: Sep. 28, 2007

(86) PCT No.: PCT/IB2007/053954
§ 371 (c)(1),
(2), (4) Date: Mar. 31, 2009

(87) PCT Pub. No.: WO2008/041166
PCT Pub. Date: Apr. 10, 2008

(65) Prior Publication Data
US 2010/0035565 A1    Feb. 11, 2010

(30) Foreign Application Priority Data
Oct. 2, 2006 (EP) .................................. 06121624
Nov. 1, 2006 (EP) .................................. 06123322

(51) Int. Cl.
H03C 7/02 (2006.01)
H04B 1/02 (2006.01)
H04B 7/02 (2006.01)
(52) U.S. Cl. .................. 455/101; 455/63.4; 455/562.1; 370/334
(58) Field of Classification Search .......... 455/25, 455/63.4, 101, 562.1; 370/334
See application file for complete search history.

(56) References Cited

U.S. PATENT DOCUMENTS

| 6,763,242 | B1* | 7/2004 | Feria et al. .......... 455/509 |
| 7,136,627 | B2* | 11/2006 | Hamalainen et al. ........ 455/101 |
| 7,480,278 | B2* | 1/2009 | Pedersen et al. .......... 370/335 |
| 8,130,862 | B2* | 3/2012 | Forenza et al. ............ 375/295 |
| 2004/0204111 | A1* | 10/2004 | Ylitalo ................ 455/562.1 |
| 2005/0074072 | A1 | 4/2005 | Kim et al. |
| 2006/0014499 | A1 | 1/2006 | Gorokhov et al. |
| 2006/0067416 | A1 | 3/2006 | Tirkkonen et al. |

FOREIGN PATENT DOCUMENTS

| EP | 1313228 A2 | 5/2003 |
| WO | 0247286 A2 | 6/2002 |
| WO | 2006048712 A2 | 5/2006 |

OTHER PUBLICATIONS

Pandey et al: "Application of MIMO and Proportional Fair Scheduling to CDMA Downlink Packet Data Channels";IEEE 56th Vehicular Technology Conference Proceedings, IEEE Vhehicular Technology Conference, NY, NY, vol. 1 of 4., Conference 56, pp. 1046-1050, 2002.

* cited by examiner

*Primary Examiner* — Nhan Le

(57) ABSTRACT

The present invention relates to a multi-beam transmission apparatus and system, and to a method for operating a multi-beam transmission system, wherein a first transmission resource information and a second transmission resource information are determined for respective first and second transmission beam, and wherein a first transmission parameter information and a second transmission parameter information are determined for the respective first and second transmission beams. The first and second transmission resource information and the first and second transmission parameter information are jointly encoded into a joint signal; and the joint signal is transmitted via the first and second transmission beams from a first station to a second station.

28 Claims, 2 Drawing Sheets

| | |
|---|---|
| 20 — DETERMINES FIRST & SECOND TRANSMISSION RESOURCE INFORMATION | DETERMINES FIRST & SECOND TRANSMISSION PARAMETER INFORMATION — 22 |
| 24 — JOINTLY ENCODES FIRST & SECOND TRANSMISSION RESOURCE & PARAMETER INFORMATION INTO A JOINT SIGNAL | TRANSMITS JOINT SIGNAL — 26 |
| 28 — INDICATES THAT FIRST & SECOND TRANSMISSION RESOURCE INFORMATION COMPRISES ONE OR MORE CHANNELIZATION CODES, SUB-CARRIERS, OR TIMESLOTS | MAPPING NUMBER OF BITS IN EACH TRANSPORT BLOCK ONTO SAID NUMBER OF CHANNELIZATION CODES — 30 |
| 32 — DESIGNS A MODULATION SCHEME TO OPERATE WITHIN GIVEN RANGE OF CODE RATES | USES ONE TO FOUR SIGNALING BITS OF JOINT SIGNAL, BASED ON TRADE-OFF BETWEEN FLEXIBILITY AND SIGNALING CHANNEL OVERHEAD, TO SIGNAL MODULATION SCHEME & CHANNELIZATION CODE SET FOR SECOND TRANSMISSION BEAM — 34 |
| 36 — USES ONE OF AVAILABLE COMBINATIONS OF SIGNALING BITS TO INDICATE A SMALLER NUMBER OF CODES FOR SECOND TRANSMISSION BEAM THAN IS USED FOR FIRST TRANSMISSION BEAM. | INDICATES THAT FIRST AND SECOND TRANSMISSION PARAMETER INFORMATION COMPRISES ONE OR MORE OF A MODULATION SCHEME OR A CODING SCHEME. — 38 |

FIG. 2

EFFICIENT CQI SIGNALING MIMO SYSTEMS WITH VARIABLE NUMBERS OF BEAMS

FIELD OF THE INVENTION

The present invention relates to a method for signaling the usage of transmission resources and transmission parameters in a multi-beam transmission system, in particular a multi-beam MIMO (multiple-in/multiple-out) system. Further, the present invention relates to a multi-beam transmission system, in particular a multi-beam MIMO system, wherein the size of the data blocks transmitted on each beam differs, utilizing different amounts of radio transmission resource and being transmitted using different transmission parameters such as modulation scheme. Moreover, the present invention relates to a computer program product for carrying out the afore-mentioned method.

The present invention can be applied in multi-antenna communication systems. In particular, a potential application of the present invention is in the MIMO feature currently being standardized for UMTS (universal mobile telecommunication system) Release 7.

BACKGROUND OF THE INVENTION

In the third generation partnership project (3GPP) a proposal called D-TxAA is under discussion for UMTS as a way of increasing the peak bit rate. This is derived from an existing closed loop transmit diversity scheme (TxAA mode 1) where the mobile terminal signals to the network complex weights which should be applied to the signals from each of two transmitting antennas. In D-TxAA two different data streams are transmitted using orthogonal weight vectors creating two different beams, wherein a first weight vector for generating a first beam is typically based on the weight vectors indicated by the mobile terminal, and a second weight vector for generating a second beam is derived deterministically from the first vector. The weight vector used for the transmission of one of the beams is indicated to the mobile terminal by means of signaling carried on a signaling channel known as the High-Speed Shared Control Channel (HS-SCCH). The beam for which the weight vector is signaled on the HS-SCCH is hereinafter denoted the "primary beam", and the other beam is hereinafter denoted the "secondary beam".

Different data blocks, known as transport blocks, are transmitted to the mobile terminal on each beam using possibly different amounts of transmission resource, such as the number of channelization codes, and possibly different transmission parameters, such as the modulation scheme. Different code rates may be employed in order to map the number of bits in each transport block onto the number of physical channel bits that may be transmitted using the selected number of channelization codes and modulation scheme. In order to enable the mobile terminal to receive and decode the transmissions, the transport block size, number of channelization codes and modulation scheme for each beam are signaled to the mobile terminal using the HS-SCCH.

In earlier versions of UMTS, only a single data stream was transmitted to the mobile terminal, requiring only one set of signaling. When a second stream is transmitted, the corresponding signaling information causes an increase in signaling overhead, which detracts from the overall data transmission capacity of the system.

Some known methods of reducing the signaling overhead related to the transmission of a second stream include restricting the set of transport block sizes which may be transmitted on one stream relative to the transport block size that is transmitted on the other beam. However, this reduces flexibility for transmitting data on each stream at the rates required by the user applications. The restriction of the set of transport block sizes may for example be applied by restricting the difference between the numbers of channelization codes used on the two beams.

One known method for reducing the signaling overhead is to require that the identity of the first code used on each beam is the same. The other codes used on each beam then form a contiguous set starting from the first code, for example from an Orthogonal Variable Spreading Factor (OVSF) code tree.

It has also been suggested that if the number of codes allocated to primary and secondary beams are restricted to be equal (i.e. "symmetric code allocation") then this will reduce signaling overhead (compared to full flexibility which would in UMTS need 4 bits to indicate the number of codes on the secondary beam and 1 bit to indicate the modulation scheme). However, this also implies a restriction on the range of transport block sizes which can be transmitted on one beam relative to the other. More specifically this means that there may be a problem with sending a small transport block on the secondary beam when a large one is sent on the primary beam. There is a ratio of about 3 between the maximum and minimum Transport Block Sizes which can be signaled for a given number of codes. This limitation can be partly alleviated by using a lower-order modulation scheme on the secondary beam compared to that used on the primary beam: for example, when the primary beam uses 16QAM, QPSK may be used on the secondary beam to enable a smaller transport block to be carried on the secondary beam.

SUMMARY OF THE INVENTION

An object of the present invention is to reduce the signaling overhead in multi-beam transmission systems and/or to reduce the restrictions on which transport block sizes may be transmitted on each beam.

It is assumed here that the secondary beam is always transmitted with a data rate that is equal to or less than that of the primary beam. In other words, the HS-SCCH always signals the precoding vector of the beam that carries the higher-rate stream. This implies that the modulation order on the secondary beam is equal to or lower than that on the primary beam.

In order to achieve the above and further objects, in accordance with a first aspect of the present invention, there is provided a method for signaling transmission resource information and transmission parameter information in a multi-beam transmission system, wherein the transmission resource information and the transmission parameter information are jointly encoded.

The first aspect of the invention is based on the recognition that by jointly encoding transmission resource information and transmission parameter information, the range of transport block sizes that may be indicated is increased without increasing the signaling overhead.

A jointly encoding of multiple parameters comprises taking different values for different transmission resources, and setting at least one bit to determine the value of more than one parameter including resource information associated with the different transmission resources.

In accordance with a second aspect of the invention, there is provided a method for signaling transmission resource information and transmission parameter information in a multi-beam transmission system, wherein the transmission resource information is selected from a set of available values wherein each value in the set of available values is related to the closest next value by a substantially similar factor or multiple.

The second aspect of the invention is based on the recognition that the code rate that may be used for coding and rate matching to map the number of bits in each transport block onto the number of physical channel bits that may be transmitted using the selected number of channelization codes and modulation scheme is designed operates within a given range (for example from 1 to ⅓), and therefore it is possible to accommodate transmission of every possible transport block size by allowing signaling of numbers of channelization codes which are separated by a ratio within the range of code rates. This reduces the number of different numbers of channelization codes that need to be able to be signaled on the HS-SCCH, and therefore reduces the signaling overhead without restricting the range of transport block sizes that can be transmitted.

In accordance with a third aspect of the present invention, there is provided a computer program for carrying out the method according to the first or second aspects of the present invention.

In accordance with a fourth aspect of the present invention, there is provided a multi-beam data transmission system comprising a first station and a second station, comprising means for signaling transmission resource information and transmission parameter information from the first station to the second station, wherein the transmission resource information and the transmission parameter information are jointly encoded.

In accordance with a fifth aspect of the present invention, there is provided a multi-beam data transmission system comprising a first station and a second station, comprising means for signaling transmission resource information and transmission parameter information from the first station to the second station, wherein the transmission resource information is selected from a set of available values wherein each value in the set of available values is related to the closest next value by a substantially similar factor or multiple.

The transmission resource information may for example comprise an indication of one or more of a number of channelization codes (for example in a CDMA system), a number of sub-carriers (for example in an OFDM system) or a number of timeslots.

The transmission parameter information may for example comprise an indication of one or more of a modulation scheme or a coding scheme.

Further advantageous embodiments are described below.

BRIEF DESCRIPTION OF THE DRAWINGS

FIG. 2 is a schematic of a multi-beam transmission system.

DESCRIPTION OF PREFERRED EMBODIMENTS

Figure 1:
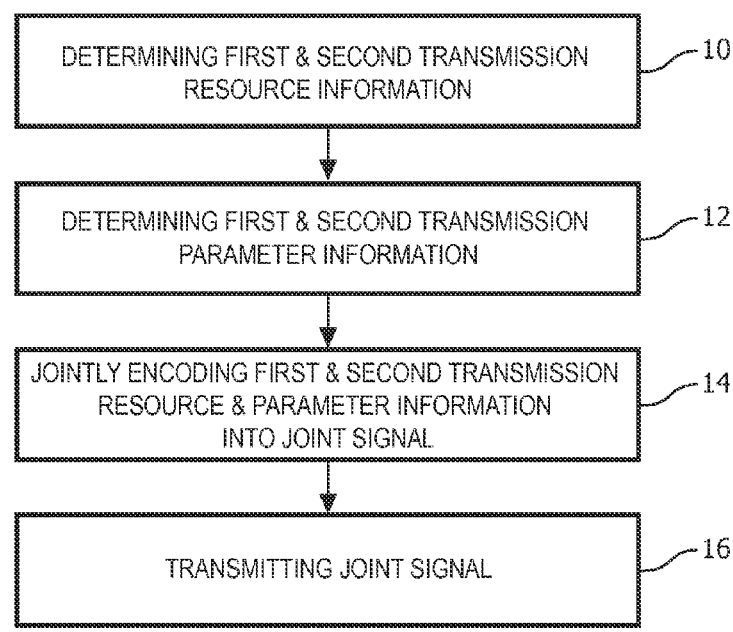
FIG. 1 is a flow diagram of the method of operating a multi-beam transmission system.

The following embodiments are for illustration only and are not intended to restrict the scope of the invention.

FIG. 1 is a flow diagram illustrating a method of operating a multi-beam transmission system comprising multiple steps. In step 10, a first transmission resource information and a second transmission resource information are determined for respective first and second transmission beams. The first and second transmission resource information may be selected from a set of available values, wherein each value in the set of available values is related to a closest next value by a substantially similar factor or a multiple. Also, the first and second transmission resource information may comprises an indication of one or more of a number of channelization codes, a number of sub-carriers or a number of timeslots. For example, the coding and rate matching to map the number of bits in each transport block onto the number of channelization codes and/or a modulation scheme may be designed to operate within a given range of code rates. Also, one bit to four signaling bits of the joint signal, based on a trade-off between flexibility and signaling channel overhead, may be used to signal the modulation scheme and a channelization code set for the second transmission beam. Also, one of an available combination of the signaling bits may be used to indicate a smaller number of codes for the second transmission beam than is used for the first transmission beam. In step 12, a first transmission parameter information and a second transmission parameter information are determined for the respective first and second transmission beams. The first and second transmission parameter information may comprise an indication of one or more of the modulation scheme or a coding scheme. In step 14, the first and second transmission resource information and the first and second transmission parameter information are jointly encoded into a joint signal. The jointly encoding of multiple parameters may comprise taking different values for different transmission resources, and setting at least one bit to determine the value of more than one parameter including resource information associated with the different transmission resources. Also, in step 16, the joint signal is transmitted via the first and second transmission beams from a first station to a second station.

FIG. 2 is a schematic illustrating a multi-beam transmission system comprising multiple portions. The arrangement of the portions in the system in the schematic representation is not intended to indicate the actual arrangement beyond that the portions are parts of the system. Portion 20 determines a first transmission resource information and a second transmission resource information for respective first and second transmission beams. Portion 20 may also be adapted to select a value from a set of available values, wherein each value in the set of available values is related to a closest next value by a substantially similar factor or a multiple. Portion 22 determines a first transmission parameter information and a second transmission parameter information for the respective first and second transmission beams. Portion 24 jointly encodes the first and second transmission resource information and the first and second transmission parameter information into a joint signal. Portion 26 transmits the joint signal via the first and second transmission beams from a first station to a second station. Portion 28 indicates that the first and second transmission resource information comprises one or more of a number of channelization codes, a number of sub-carriers or a number of timeslots. Portion 30 maps the number of bits in each transport block onto the number of channelization codes. Portion 32 designs a modulation scheme to operate within a given range of code rates. Portion 34 uses one to tour signaling bits of the joint. signal, based on a trade-off between flexibility and signaling channel overhead, to signal the modulation scheme and a channelization code set for the second transmission beam. Portion 36 uses one of an available combination of signaling bits to indicate a smaller number of codes for the second transmission beam than is. used for the first transmission beam. Portion 38 indicates that the first and second transmission parameter information comprises one or more of the modulation scheme or a coding scheme.

In a typical embodiment, a maximum of 15 channelization codes may be used for transmission on each of two beams. 16QAM or QPSK modulation may be used, which can be indicated by one signaling bit on the HS-SCCH.

A conventional system operating according to the prior art might apply the restriction that the same number of codes must be used on both beams, so that when 15 codes are used for the transmission of a transport block using QPSK modulation and a code rate of 1 on the first beam, the smallest transport block that may be transmitted on the second beam is ⅓ the size of the transport block on the first beam (assuming that the minimum code rate is ⅓). Alternatively, a conventional system may use up to 4 additional signaling bits to signal the number of channelization codes used for the second beam in order to allow a larger difference between the primary beam transport block size and the secondary beam transport block size.

In one embodiment according to the invention, just 1 bit may be used to signal the Modulation Scheme (MS) and Channelization Code Set (CCS) for the secondary beam (in addition to the 1 bit used to signal the MS for the primary beam). It is thereby possible to use one of the available combinations of signaling bits to indicate a smaller number of codes for the secondary beam than is used for the primary beam (see Table 1). Note that since the choice of modulation and number of codes used on the secondary beam is not a critical parameter, full resolution in number of codes may not always be needed.

TABLE 1

Signaling number of codes with 1 bit MS/CCS for secondary beam

| Modulation on Primary Beam | Modulation on Secondary Beam | Number of codes on primary beam | Number of codes on secondary beam | Signaled MS value for primary beam | Signaled MS/CCS value for secondary beam |
|---|---|---|---|---|---|
| 16QAM | 16QAM | X | X | 1 | 1 |
| 16QAM | QPSK | X | X | 1 | 0 |
| QPSK | QPSK | X | X | 0 | 1 |
| QPSK | QPSK | X | Given by Table 2 | 0 | 0 |

For the case of QPSK on both beams and MS/CCS combination "00" for the secondary beam, the number of codes on the secondary beam is given by Table 2 (depending on the number of codes used for the primary beam, which is signaled by a separate bit-field in the same way as Rel-5). The intention is that the number of codes on the secondary beams is about half that on the primary beam, so that the range of supported transport block sizes is as wide as possible, but without requiring extreme code rates.

TABLE 2

Number of codes on primary and secondary beams for 1 bit MS/CCS for secondary beam

| Number of codes on primary beam = X | Number of codes on secondary beam (~X/2) |
|---|---|
| 15 | 7 |
| 14 | 7 |
| 13 | 7 |
| 12 | 6 |
| 11 | 6 |

TABLE 2-continued

Number of codes on primary and secondary beams for 1 bit MS/CCS for secondary beam

| Number of codes on primary beam = X | Number of codes on secondary beam (~X/2) |
|---|---|
| 10 | 5 |
| 9 | 5 |
| 8 | 4 |
| 7 | 4 |
| 6 | 3 |
| 5 | 3 |
| 4 | 2 |
| 3 | 2 |
| 2 | 1 |
| 1 | 1 |

In some embodiments, the numbers of codes $N_2$ that may be signaled for the secondary beam may be derived from the number of codes $N_1$ that is used for the primary beam according to a formula such as $$N_2 = \left\lceil \frac{N_1}{2^x} \right\rceil \text{ or } N_2 = \left\lfloor \frac{N_1}{2^x} \right\rfloor \text{ where } x \in \{1, 2, 3, 4\}.$$

If two bits are allowed for the MS/CCS on the secondary beam then even more flexibility is possible, as shown in Table 3.

TABLE 3

Signaling number of codes with 2 bit MS/CCS for secondary beam

| Modulation on Primary Beam | Modulation on Secondary Beam | Number of codes on primary beam | Number of codes on secondary beam | Signaled MS value for primary beam | Signaled MS/CCS value for secondary beam |
|---|---|---|---|---|---|
| 16QAM | 16QAM | X | X | 1 | 11 |
| 16QAM | QPSK | X | X | 1 | 10 |
| 16QAM | QPSK | X | Given by Table 2 | 1 | 01 |
| 16QAM | QPSK | X | Given by Table 4 | 1 | 00 |
| QPSK | QPSK | X | X | 0 | 11 |
| QPSK | QPSK | X | Given by Table 2 | 0 | 10 |
| QPSK | QPSK | X | Given by Table 4 | 0 | 01 |
| QPSK | QPSK | X | 1 | 0 | 00 |

TABLE 4

Additional table of number of codes on primary and secondary beams for 2 bit MS/CCS for secondary beam

| Number of codes on primary beam = X | Number of codes on secondary beam (~X/4) |
|---|---|
| 15 | 3 |
| 14 | 3 |
| 13 | 3 |
| 12 | 3 |
| 11 | 3 |
| 10 | 3 |
| 9 | 3 |

TABLE 4-continued

Additional table of number of codes on primary and
secondary beams for 2 bit MS/CCS for secondary beam

| Number of codes on primary beam = X | Number of codes on secondary beam (~X/4) |
|---|---|
| 8 | 2 |
| 7 | 2 |
| 6 | 2 |
| 5 | 2 |
| 4 | 1 |
| 3 | 1 |
| 2 | 1 |
| 1 | 1 |

This principle could be extended to 3 bits MS/CCS signaling for the secondary beam or 4 bits (which would give full flexibility for all numbers of codes on the primary beam).

In addition, the same approach can be applied if potential support for 64QAM is to be added to the specification at this stage.

For example, with a total of 4 bits for signaling both the primary beam MS and the secondary beam MS/CCS, and including the possibility of 64QAM, the combinations of modulation scheme and number of codes shown in Table 5 could be signaled:

TABLE 5

Signaling number of codes with
2 bit MS/CCS for secondary beam

| Modulation on Primary Beam | Modulation on Secondary Beam | Number of codes on primary beam | Number of codes on secondary beam | Signaled value for primary beam MS and secondary beam MS/CCS |
|---|---|---|---|---|
| 64QAM | 64QAM | X | X | 1111 |
| 64QAM | 16QAM | X | X | 1110 |
| 64QAM | QPSK | X | X | 1101 |
| 64QAM | QPSK | X | Given by Table 2 | 1100 |
| 64QAM | QPSK | X | Given by Table 4 | 1011 |
| 64QAM | QPSK | X | 1 | 1010 |
| 16QAM | 16QAM | X | X | 1001 |
| 16QAM | QPSK | X | X | 1000 |
| 16QAM | QPSK | X | Given by Table 2 | 0111 |
| 16QAM | QPSK | X | Given by Table 4 | 0110 |
| 16QAM | QPSK | X | 1 | 0101 |
| QPSK | QPSK | X | X | 0100 |
| QPSK | QPSK | X | Given by Table 2 | 0011 |
| QPSK | QPSK | X | Given by Table 4 | 0010 |
| QPSK | QPSK | X | 1 | 0001 |

This enables the complete range of transport block sizes to be sent on both beams without requiring any more signaling bits than the 2 bits per beam that have been proposed for signaling the modulation schemes allowing for 64QAM.

In general, the number of bits for the MS/CCS can be selected on the basis of a trade-off between flexibility and HS-SCCH overhead.

The invention may be further extended such that the transmission resource information may take a value of zero for one of the beams. This means that the jointly-coded signal may indicate the number of beams transmitted. For example, if two bits are allowed for the MS/CCS on the secondary beam, the embodiment shown in Table 3 may be modified as shown in Table 6.

TABLE 6

Signaling number of codes with 2 bit MS/CCS for secondary
beam, including possibility to signal that the second beam is
not transmitted (i.e. number of codes = 0).

| Modulation on Primary Beam | Modulation on Secondary Beam | Number of codes on primary beam | Number of codes on secondary beam | Signaled MS value for primary beam | Signaled MS/CCS value for secondary beam |
|---|---|---|---|---|---|
| 16QAM | 16QAM | X | X | 1 | 11 |
| 16QAM | QPSK | X | X | 1 | 10 |
| 16QAM | QPSK | X | Given by Table 2 | 1 | 01 |
| 16QAM | QPSK | X | 0 | 1 | 00 |
| QPSK | QPSK | X | X | 0 | 11 |
| QPSK | QPSK | X | Given by Table 2 | 0 | 10 |
| QPSK | QPSK | X | Given by Table 4 | 0 | 01 |
| QPSK | QPSK | X | 0 | 0 | 00 |

Similarly, with a total of 4 bits for signaling both the primary beam MS and the secondary beam MS/CCS, the embodiment shown in Table 5 may be modified as shown in Table 7.

TABLE 7

Signaling number of codes with a total of 4 bits, including
possibility to signal that the second beam is not transmitted
(i.e. number of codes = 0).

| Modulation on Primary Beam | Modulation on Secondary Beam | Number of codes on primary beam | Number of codes on secondary beam | Signaled value for primary beam MS and secondary beam MS/CCS |
|---|---|---|---|---|
| 64QAM | 64QAM | X | X | 1111 |
| 64QAM | 16QAM | X | X | 1110 |
| 64QAM | QPSK | X | X | 1101 |
| 64QAM | QPSK | X | Given by Table 2 | 1100 |
| 64QAM | QPSK | X | Given by Table 4 | 1011 |
| 64QAM | QPSK | X | 0 | 1010 |
| 16QAM | 16QAM | X | X | 1001 |
| 16QAM | QPSK | X | X | 1000 |
| 16QAM | QPSK | X | Given by Table 2 | 0111 |
| 16QAM | QPSK | X | Given by Table 4 | 0110 |
| 16QAM | QPSK | X | 0 | 0101 |
| QPSK | QPSK | X | X | 0100 |
| QPSK | QPSK | X | Given by Table 2 | 0011 |
| QPSK | QPSK | X | Given by Table 4 | 0010 |
| QPSK | QPSK | X | 0 | 0001 |

These extensions allow further reduction of the signaling overhead, by avoiding the need for an additional bit to indicate whether the secondary beam is transmitted or not.

Although the invention has been described primarily in relation to transmissions from base stations to mobile terminals, the invention is also applicable to transmissions from mobile terminals to base stations, and between peer nodes.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the art of radio communication and which may be used instead of or in addition to features already described herein.

The invention claimed is:

1. A method of operating a multi-beam transmission system, comprising the steps of:
    a. determining a first transmission resource information and a second transmission resource information for respective first and second transmission beams;
    b. determining a first transmission parameter information and a second transmission parameter information for said respective first and second transmission beams;
    c. jointly encoding said first and second transmission resource information and said first and second transmission parameter information into a joint signal; and
    d. transmitting said joint signal via said first and second transmission beams from a first station to a second station.

2. The method according to claim 1, wherein said first and second transmission resource information is selected from a set of available values, wherein each value in the set of available values is related to a closest next value by a substantially similar factor or a multiple.

3. The method according to claim 1, wherein said first and second transmission resource information comprises an indication of one or more of a number of channelization codes, a number of sub-carriers or a number of timeslots.

4. The method according to claim 3, wherein coding and rate matching to map the number of bits in each transport block onto said number of channelization codes and/or a modulation scheme is designed to operate within a given range of code rates.

5. The method according to claim 4, wherein one bit to four signaling bits of said joint signal, based on a trade-off between flexibility and signaling channel overhead, are used to signal said modulation scheme and a channelization code set for said second transmission beam.

6. The method according to claim 4, wherein one of an available combination of said signaling bits is used to indicate a smaller number of codes for said second transmission beam than is used for said first transmission beam.

7. The method according to claim 1, wherein said first and second transmission parameter information comprises an indication of one or more of said modulation scheme or a coding scheme.

8. The method according to claim 1, wherein said jointly encoding of multiple parameters comprises taking different values for different transmission resources, and setting at least one bit to determine the value of more than one parameter including resource information associated with said different transmission resources.

9. A multi-beam transmission apparatus, comprising:
    a. means for determining a first transmission resource information and a second transmission resource information for respective first and second transmission beams;
    b. means for determining a first transmission parameter information and a second transmission parameter information for said respective first and second transmission beams;
    c. means for jointly encoding said first and second transmission resource information and said first and second transmission parameter information into a joint signal; and
    d. means for transmitting said joint signal via said first and second transmission beams from a first station to a second station.

10. The multi-beam transmission apparatus according to claim 9, wherein said means for determining said first and second transmission resource information are adapted to select a value from a set of available values, wherein each value in said set of available values is related to a closest next value by a substantially similar factor or a multiple.

11. The multi-beam transmission apparatus according to claim 9, further comprising means for indicating that said first and second transmission resource information comprises one or more of a number of channelization codes, a number of sub-carriers or a number of timeslots.

12. The multi-beam transmission apparatus according to claim 11, further comprising coding and rate matching means for mapping the number of bits in each transport block onto said number of channelization codes and/or means for designing a modulation scheme to operate within a given range of code rates.

13. The multi-beam transmission apparatus according to claim 12, further comprising means for using one to four signaling bits of said joint signal, based on a trade-off between flexibility and signaling channel overhead, to signal said modulation scheme and a channelization code set for said second transmission beam.

14. The multi-beam transmission apparatus according to claim 12, further comprising means for using one of an available combination of signaling bits to indicate a smaller number of codes for said second transmission beam than is used for said first transmission beam.

15. The multi-beam transmission apparatus according to claim 9, further comprising means for indicating that said first and second transmission parameter information comprises one or more of said modulation scheme or a coding scheme.

16. A multi-beam transmission system, comprising:
    a. a first station and a second station; and
    b. means for determining a first transmission resource information and a second transmission resource information for respective first and second transmission beams; and
    c. means for determining a first transmission parameter information and a second transmission parameter information for said respective first and second transmission beams; and
    d. means for jointly encoding said first and second transmission resource information and said first and second transmission parameter information into a joint signal; and
    e. means for transmitting said joint signal via said first and second transmission beams from said first station to said second station.

17. The multi-beam transmission system according to claim 16, wherein said first and second transmission resource information is selected from a set of available values, wherein each value in said set of available values is related to a closest next value by a substantially similar factor or a multiple.

18. The multi-beam transmission system according to claim 16, wherein said first and second transmission resource information comprises an indication of one or more of a number of channelization codes, a number of sub-carriers or a number of timeslots.

19. The multi-beam transmission system according to claim 18, wherein coding and rate matching to map the number of bits in each transport block onto said number of channelization codes and/or a modulation scheme is designed to operate within a given range of code rates.

20. The multi-beam transmission system according to claim 19, wherein one to four signaling bits of said joint signal, based on a trade-off between flexibility and signaling channel overhead, are used to signal said modulation scheme and a channelization code set for said second transmission beam.

21. The multi-beam transmission system according to claim 19, wherein one of an available combination of said signaling bits is used to indicate a smaller number of codes for said second transmission beam than is used for said first transmission beam.

22. The multi-beam transmission system according to claim 16, wherein said first and second transmission parameter information comprises an indication of one or more of said modulation scheme or a coding scheme.

23. The multi-beam transmission system according to claim 16, wherein said first station is a base station and said second station is a mobile terminal or vice versa.

24. The multi-beam transmission system according to claim 16, wherein said first and second stations are network nodes.

25. The multi-beam transmission system according to claim 16, wherein a plurality of different types and/or equal types of stations and/or network nodes are involved.

26. The mobile station for use in a multi-beam transmission system according to claim 16.

27. The base station for use in a multi-beam transmission system according to claim 16.

28. The signal for use in a multi-beam transmission system according to claim 16, wherein said signal corresponds to said joint signal.

\* \* \* \* \*